United States Patent [19]
Bahar et al.

[11] Patent Number: 5,381,511
[45] Date of Patent: Jan. 10, 1995

[54] FLEXIBLE ELECTRICALLY HEATABLE HOSE

[75] Inventors: Bamdad Bahar; Edward L. Kozlowski, Jr., both of Elkton, Md.

[73] Assignee: W. L. Gore & Associates, Inc., Newark, Del.

[21] Appl. No.: 71,717

[22] Filed: Jun. 2, 1993

[51] Int. Cl.6 ............... F16L 53/00; F16L 55/00
[52] U.S. Cl. ................... 392/472; 392/480; 138/104
[58] Field of Search ........... 138/33, 103, 104, 179; 174/47; 392/472, 480

[56] References Cited

U.S. PATENT DOCUMENTS

| | | |
|---|---|---|
| 2,243,220 | 5/1941 | Pitman . |
| 2,416,561 | 2/1947 | Albin ........................ 174/47 |
| 2,809,268 | 10/1957 | Heron ...................... 392/472 |
| 3,727,029 | 4/1973 | Chrow ....................... 138/33 |
| 4,038,519 | 7/1977 | Foucras ..................... 138/33 |
| 4,194,536 | 3/1980 | Stine ........................ 138/103 |
| 4,214,147 | 7/1980 | Kraver ...................... 138/33 |
| 4,455,474 | 6/1984 | Jameson et al. . |
| 4,553,023 | 11/1985 | Jameson et al. . |
| 4,667,084 | 5/1987 | Regge . |
| 4,693,324 | 9/1987 | Choiniere ................. 174/47 |
| 4,706,711 | 11/1987 | Czvikovszky ............ 138/103 |
| 4,824,925 | 10/1989 | Dickerson ................. 138/33 |
| 5,073,268 | 12/1991 | Saito et al. . |
| 5,106,503 | 4/1992 | Ohmi et al. . |
| 5,115,077 | 5/1992 | Matsuo et al. . |

FOREIGN PATENT DOCUMENTS

| | | | |
|---|---|---|---|
| 573007 | 2/1958 | Italy ........................ 392/472 |
| 744435 | 2/1956 | United Kingdom .......... 174/47 |
| 857534 | 12/1960 | United Kingdom ......... 392/472 |

OTHER PUBLICATIONS

ICI Advanced Materials-High Performance Engineering Thermoplastic Bulletin 300-990-Victrex PES--PEEK 1990.
ICI Advanced Material-The High Temperature Engineering Thermoplastic-Properties and Processing-Victrex PEEK 1990.

*Primary Examiner*—David A. Scherbel
*Assistant Examiner*—Terrence R. Till
*Attorney, Agent, or Firm*—Gary A. Samuels

[57] ABSTRACT

A heatable hose assembly having a helically corrugated central polymer tube of polyether ether ketone wrapped with a layer of polymer tape. A means for heating the central polymer tube is arranged on the layer of high strength tape as is a means for monitoring and controlling the means for heating the central polymer tube. Surrounding the arrangement is a layer of thermal insulation and a protective jacket. The heatable hose assembly is of utility for use in systems for the monitoring of acid gases from emission stacks.

6 Claims, 3 Drawing Sheets

FLEXIBLE ELECTRICALLY HEATABLE HOSE

FIELD OF THE INVENTION

This invention relates to flexible heatable hoses. More specifically, this invention relates to a flexible heatable hose having a central polymeric tube of an impermeable material and a means for heating the central polymeric tube.

BACKGROUND OF THE INVENTION

Heatable hoses have been fabricated for incorporation in many different end uses. For example, they can be used in hot melt adhesive applications to transport hot adhesive. They can also be used to transport hot gases to exit stacks without cooling the exit gas to below the dew point. Depending on the end-use requirements of these hoses, a variety of central tubes have been used in the past to make the hoses. Commonly, the central tube is made of a metal, such as stainless steel, providing the hose with a great deal of strength and chemical resistance. However, hoses having metal tubes, while readily available and reasonably inexpensive, are heavy and not very flexible.

Heatable hoses with polymeric tubes are also known in the art. The polymeric tubes commonly used in heatable hoses are fluoropolymers such as polytetrafluoroethylene (PTFE), a copolymer of tetrafluoroethylene and perfluoro(propyl vinyl ether) (PFA) or fluorinated ethylene propylene (FEP). These fluoropolymers are heat stable and exhibit lower weight per unit length for a certain thickness tube than a comparable metal tube. Fluoropolymer tubes are also relatively flexible when compared to metal tubes of comparable sizes and shapes. However, hoses containing fluoropolymer tubes typically do not possess as high strength as comparable hose containing a metal tube. This is of concern if the hose is of an extended length and is required to support its own weight. The strength of the fluoropolymer tube may be adversely effected by temperatures at which the hose may be heated. Also, fluoropolymer tubes exhibit a measure of permeation to certain gases, particularly acid gases such as $NO_x$ and $SO_x$. This is of concern when a hose containing a fluoropolymer tube is part of a gas sampling device attached to a emitting stack for the detection and measurement of acid gases.

It would be desirable to have a flexible heatable hose comprising a polymeric tube that is relatively light, relatively strong, relatively flexible and is relatively impermeable to many acid gases, even at elevated temperatures.

SUMMARY OF THE INVENTION

The invention is a flexible heatable hose comprising a central helically corrugated polymer tube, comprising polyether ether ketone (PEEK). The tube is surrounded by a wrapped layer of heat-resistant polymer tape. A means for heating the polymer tube is provided and a means for monitoring and controlling the heat reaching the polymer tube is also provided. Surrounding the polymer tube and wrapped layer of tape is a layer of thermal insulation and then an outside layer of protective jacket. The helically corrugated PEEK tube is preferably made by extrusion. Ordinarily tubes made of PEEK are not very flexible, and are normally too stiff in the form of a plain tube to be suitable for the central tube of a hose which must be flexible as well as chemical resistant. However, helical corrugation of the central tube surprisingly provides considerable flexibility to the hose along with the requisite chemical resistance.

DETAILED DESCRIPTION OF THE INVENTION

Figure 1:
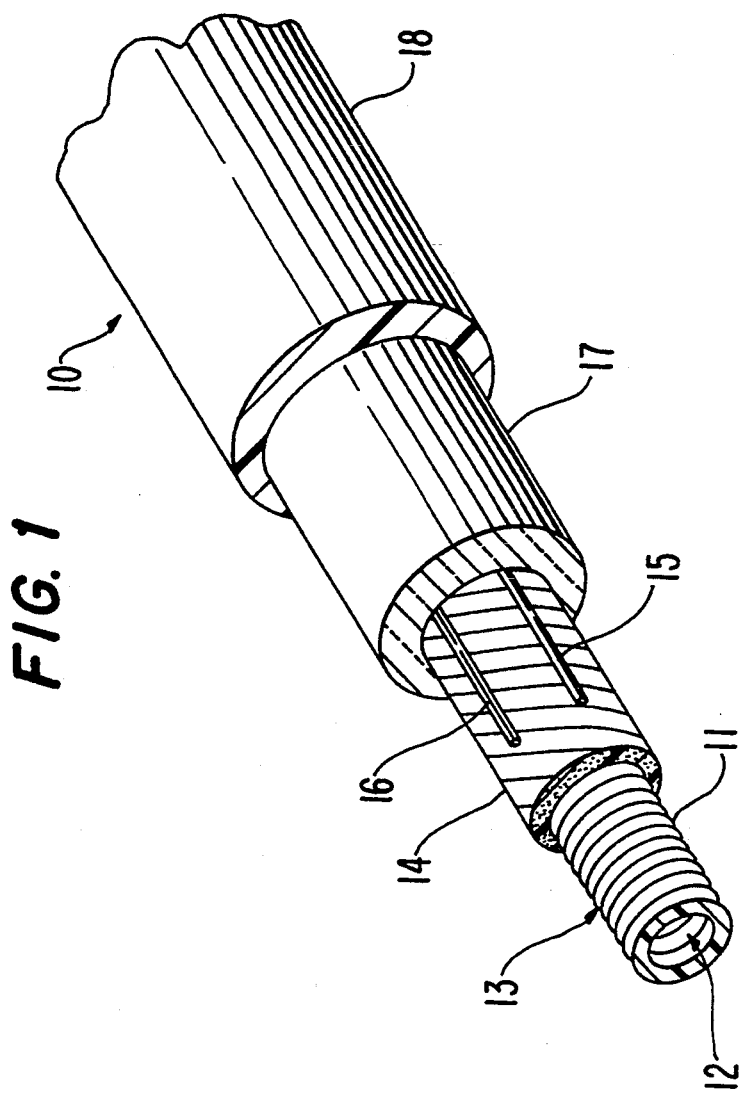
FIG. 1 is a perspective view, partly in cross-section, of the heatable hose of the invention.

Referring now to the figures for a fuller description of the heatable hose of the invention, FIG. 1 shows a cross-section of an embodiment of the heatable hose 10 of the invention with the various layers exposed. A central helically corrugated polymer tube 13 having a bore 12 and helical corrugation 11 is depicted. The central polymeric tube 13 comprises polyether ether ketone (PEEK), and is made by extrusion of melted PEEK polymer from an extruder through a rotating threaded die under vacuum while cooling the formed corrugated tube.

Upon the outside surface of the central polymeric tube 13 is wrapped a layer of polymer tape 14. The tape may be of porous expanded polytetrafluoroethylene (ePTFE) made according to the method taught in U.S. Pat. No. 3,953,566 to W. L. Gore & Associates, Inc. The expanded porous tape may be compressed and densified to improve its strength.

Figure 2:
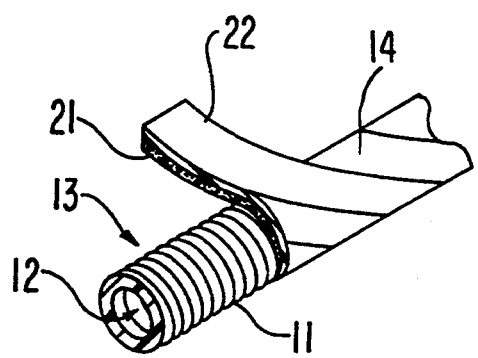
FIG. 2 is a perspective view, partly in cross-section, of a portion of the inventive heatable hose.

In addition, as shown in FIG. 2, the tape 14 also may be a composite tape containing a layer of ePTFE 21 onto which is adhered a smooth layer of a thermoplastic polymer 22 having a melt point of 342° C. or less and a thickness of 50 micrometers or less)

The composite tape can be produced by the following process which comprises the steps of:

(a) mixing PTFE resin with a hydrocarbon extrusion aid to form a paste;
(b) compressing the paste into a billet;
(c) extruding the billet through a die in a ram-type extruder to form a coherent PTFE shape;
(d) compressing the coherent PTFE shape;
(e) removing the hydrocarbon extrusion aid from the coherent PTFE shape;
(f) stretching the coherent PTFE shape 1.5 to 5 times its original length;
(g) contacting a surface of the coherent PTFE shape with a thermoplastic polymeric layer;
(h) heating the coherent PTFE shape to a temperature above the melt point of the thermoplastic polymeric layer and at or below 342 ° C.; and
(i) expanding the coherent PTFE shape at a temperature at or above the melt point of the thermoplastic polymeric layer and at or below 342 ° C.

The thermoplastic polymer may be polypropylene, polyamide, polyester, polyurethane, polyethylene or polyether ether ketone. Preferably, the thermoplastic polymer is a thermoplastic fluoropolymer. Thermoplastic fluoropolymers which are of utility as the thermoplastic polymer include fluorinated ethylene propylene (FEP), copolymer of tetrafluoroethylene and perfluoro(propylvinyl ether) (PFA), homopolymers of polychlorotrifluoroethylene (PTFE) and its copolymers with TFE or difluoroethylene (VF2), ethylenechlorotrifluoroethylene (ECTFE) copolymer and its modifications, ethylene-tetrafluoroethylene (ETFE) copolymer and its modifications, polyvinylidene fluoride (PVDF), and polyvinylfluoride (PVF). Thermoplastic fluoropolymers are preferred as the thermoplastic polymer, since thermoplastic fluoropolymers are relatively high temperature resistant. Thermoplastic fluoropolymers are also relatively inert in nature and therefore exhibit resistance to degradation from many chemicals.

As shown in FIG. 2, the composite tape may be wrapped upon the outside surface of the central polymeric tube 13 so that the layer of ePTFE 21 is in contact with the outside surface of the central polymeric tube 13. Alternatively, the composite tape may be wrapped in such a manner that the smooth layer of a thermoplastic polymer 22 is in contact with the outside surface of the central polymeric tube 13.

Wrapping of the tape 14 on central polymeric tube 13 may be accomplished by hand. Preferably, wrapping of the tape on central polymeric tube 13 is accomplished through the use of a tape-wrap machine well known in the art of wrapping dielectric layers on conductors. The tape-wrap machine applies the tape with a degree of back tension in a helical fashion around central polymeric tube 13.

Alternatively, the tape 14 may be wrapped around the central polymeric tube 13 in a longitudinal fashion so that the tape forms a longitudinal seam on tube 13.

Referring back to FIG. 1, a heating means 16 for heating the central polymeric tube 13 and a monitoring means 15 for monitoring and controlling the heating of the central polymeric tube 13 are placed longitudinally on the layer of tape 14. The means 16 for heating the central polymeric tube 13 is commonly an electrical heating wire or resistor, including resistors containing carbon, having a certain electrical resistance such that when an electrical current flows through the wire, a measure of energy present in the electrical current is lost in the form of heat. The means 15 for monitoring and controlling means 16 for heating the central polymeric tube 13 is commonly a thermocouple wire.

Figure 3:
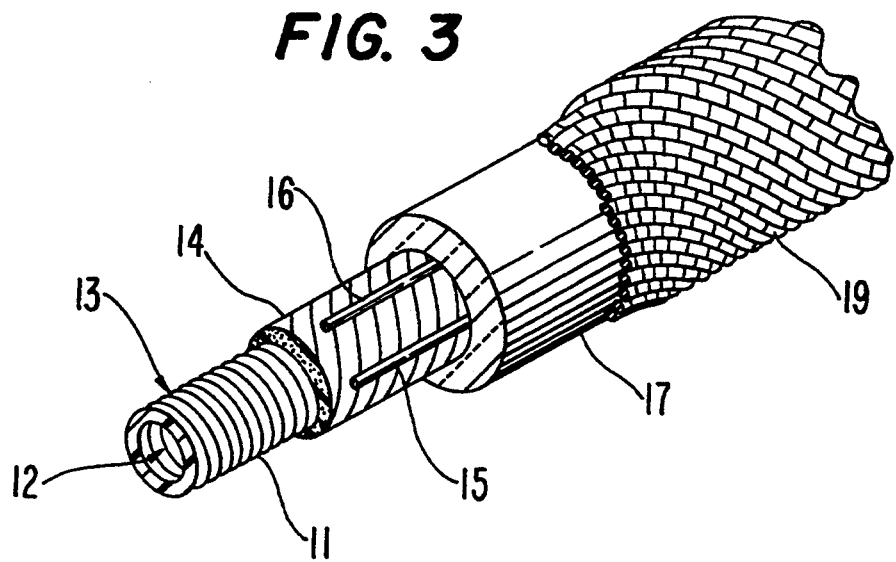
FIG. 3 is a perspective view, partly in cross-section, of another embodiment of the heatable hose of the invention.

Surrounding the arrangement of the means 16 for heating the central polymeric tube 13 and means 15 for monitoring and controlling the means for heating the central polymeric tube is a layer of thermal insulation 17, which can be any heat resistant insulation, such as glass fiber or Nomex ® aromatic polyamide, or the like. Surrounding the layer of thermal insulation 17 is a jacket 18. Jacket 18 provides physical protection to the heated hose. Jacket 18 may be in the form of a polymeric material extruded or tape wrapped upon the layer of thermal insulation 17. Representative materials for the jacket include polyvinyl chloride, FEP, PFA, PTFE, ePTFE, nitrile rubber, butyl rubber, urethane or the like. In FIG. 3, jacket 18 is shown in the form of a metal braid 19.

Figure 4:
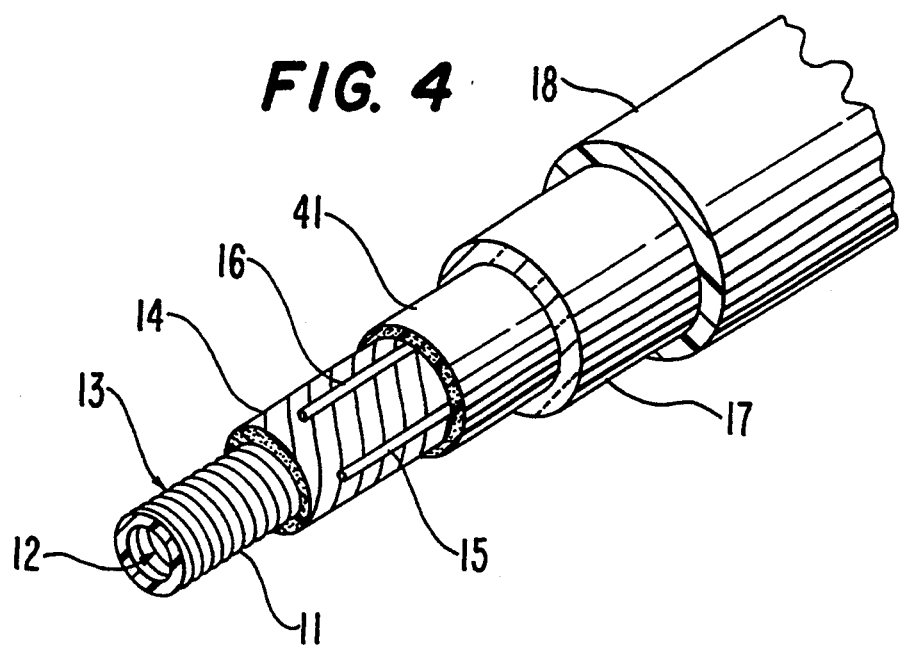
FIG. 4 is a perspective view, partly in cross-section, of another embodiment of the heatable hose of the invention.

FIG. 4 depicts an alternate embodiment of the heated hose wherein a binding layer 41 is applied prior to the tape wrapping of insulation layer 17. The binding layer 41 is applied to prevent excessive movement of the heating means 16 and the monitoring means 15. The binding layer 41 may be any heat-resistant material such as polyimide resin or PTFE. A preferred form of the binding layer is ePTFE.

In one embodiment, a helically convoluted PEEK central polymeric tube was used having a relative density of 1.4 g/cm. The tape 14 contained ePTFE having a coating of FEP on it. The conductive wire for heating was a nickel/chromium wire. The means for monitoring and controlling was a thermocouple wire. The thermal insulation 17 was glass fiber and the jacket 18 made of polyvinyl chloride.

Figure 5:
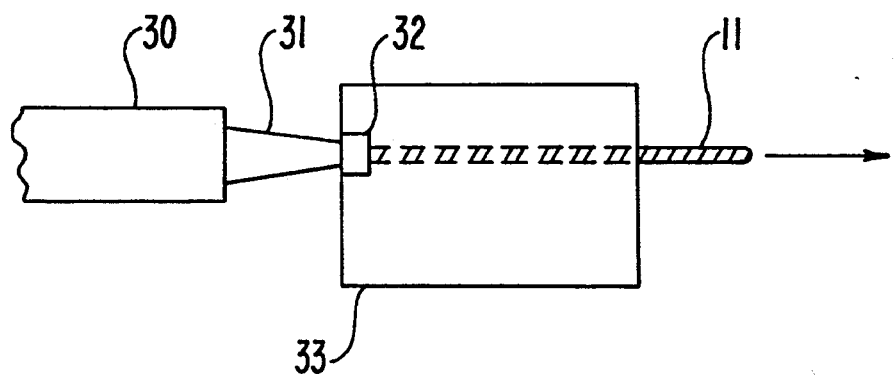
FIG. 5 is a schematic view of the extrusion process of the central helically corrugated polymer tube of the invention.

FIG. 5 displays a schematic diagram of the process for making the central helically corrugated polymer tube used as the core of the heatable hose of the invention. A tubular stream of melted polymer 31 issues from extruder 30 into rotating die 32. Die 32 has grooves formed in its bore which shape stream 31 of polymer into a helical form under vacuum. The vacuum pulls melted polymer 31 into the grooves of die 32. Die 32 is located in a cooling chamber 33. The viscosity of melted polymer 31 is balanced against the cooling rate in chamber 33 and the rate of extrusion so that the helical grooves will form properly under vacuum in die 32, be retained by the tube, and not be ballooned out of shape by the vacuum applied in chamber 33 or the pull of tube 11 which has cooled and hardened. In one embodiment, the die 32 may rotate at about 11 revolutions/second and the extruder may extrude tube at about 0.5 inch/second. The viscosity of the melted polymer issuing from extruder 30 as tube 31 is controlled by adjusting the heat profile of extruder 30 in known manner.

The central helically corrugated polymer tube is extruded so that unlimited lengths of tube may be made.

Other embodiments of the invention will be apparent to those skilled in the art from a consideration of this specification or practice of the invention disclosed herein. It is intended that the specification be considered as exemplary only, with the true scope and spirit of the invention being indicated by the following claims.

We claim:

1. A heatable hose comprising in order:
   (a) a central helically corrugated polymer tube comprising polyether ether ketone;
   (b) a layer of polymer tape wrapped upon the outside surface of said central polymer tube;
   (c) a means for heating said central polymer tube and a means for monitoring and controlling the means for heating the central polymer tube arranged on the layer of polymer tape;
   (d) a layer of thermal insulation surrounding the means recited in element (c); and
   (e) a protective jacket surrounding said thermal insulation layer.

2. The hose of claim 1 wherein the tape (b) comprises expanded porous polytetrafluoroethylene having a layer of a thermoplastic, fluoropolymer on said expanded porous polytetrafluoroethylene.

3. The hose of claim 2 wherein the means for heating the central polymeric tube is an electrical heating wire.

4. The hose of claim 3 wherein the means for monitoring and controlling the means for heating comprises a thermocouple wire.

5. The hose of claim 4 wherein the thermal insulation comprises glass fibers.

6. A heatable hose comprising in order:
   (a) a central helically corrugated polymer tube comprising polyether ether ketone;

(b) a layer of polymer tape comprising expanded porous polytetrafluoroethylene wrapped upon the outside surface of said central polymer tube;

(c) a means for heating said central polymer tube and a means for monitoring and controlling the means for heating the central polymer tube arranged on the layer of polymer tape;

(d) a layer of thermal insulation surrounding the means recited in element (c); and (e) a protective jacket surrounding said thermal insulation layer.

* * * * *